United States Patent [19]

Jaw

[11] Patent Number: 4,823,831

[45] Date of Patent: Apr. 25, 1989

[54] NOZZLE FOR INFLATABLE OBJECTS

[76] Inventor: Horng-Chang Jaw, 6 Fl., No. 21, Alley 29, Lane 372, Sec. 5, Chungsiao E. Rd., Taipei, Taiwan

[21] Appl. No.: 253,225

[22] Filed: Oct. 4, 1988

[51] Int. Cl.$^4$ .................. F16K 15/18; F16K 15/20
[52] U.S. Cl. .................................. 137/223; 137/232; 137/855; 446/224
[58] Field of Search .............. 137/223, 232, 614.2, 137/614.21, 855; 446/224

[56] References Cited

U.S. PATENT DOCUMENTS 2,839,073  6/1958  Marsh .......................... 137/232

FOREIGN PATENT DOCUMENTS 797059   6/1958  United Kingdom ........... 137/232
941239  11/1963  United Kingdom ........... 137/223
947559   1/1964  United Kingdom ........... 137/223

*Primary Examiner*—Arnold Rosenthal
*Attorney, Agent, or Firm*—Bernard R. Gans

[57] ABSTRACT

A nozzle for inflatable objects being made of a plastic material, including a nozzle seat which is subject to engage with the inflatable object in such a manner that it is normally retracted in the inflatable object but also being extendable from the surface of the inflatable object when being pulled out; and annular wall extended from the nozzle seat which defines an air inlet; a plug for insertion into the air inlet; a plug arm extended from the annular wall and connecting the plug with the nozzle seat; a plug extension extended from the plug at a position remote from the plug arm and having two holes; a tie at a side of the air inlet opposite the plug arm being passable through the two holes on the plug extension; and a piece of one-way membrane extended from a lower face of the nozzle seat which during inflation allows air to blow in through the air inlet but which blocks air from flowing out of the air inlet when the nozzle seat is protruded from the surface of the inflatable object.

5 Claims, 5 Drawing Sheets

NOZZLE FOR INFLATABLE OBJECTS

BACKGROUND OF THE INVENTION

The present invention relates generally to nozzles, and more particularly, to a nozzle for inflatable objects, such as toy balloons, beach balls, beach mattresses, air pillows or the like.

Conventional nozzles, as shown in FIG. 8, for toy balloons, beach balls and beach mattresses are inadequate as they have the following drawbacks:

1. One should inflate the inflatable object in a continuous manner and keep one's lip abutted against the nozzle before the object is sufficiently inflated or place one's fingers around the nozzle so as to grip the nozzle tightly while letting one's mouth rest, otherwise the air already in the inflatable object would leak out to the atmosphere.

2. When one has finished the inflation procedure, one should grip the nozzle tightly before closing the nozzle by inserting a plug properly, otherwise the air inside the inflatable object would be released to the atmosphere.

3. When the inflated object is subject to vigorous utilization, such as kicking, bouncing or hard blows, the plug of the nozzle is easily loosened and the nozzle is thus easily jolted open thereby releasing the air from the object.

4. The nozzle is inconvenient to use, since it is not easy to grip the nozzle tightly.

SUMMARY OF THE INVENTION

It is therefore a primary object of the present invention to provide a nozzle for inflatable objects such as toy balloons, beach balls, beach mattresses or the like, which obviates the afore-mentioned drawbacks.

Another object of the present invention is to provide a nozzle which further comprises a resilient one-way membrane such that air can be input into or enter the inflatable object without being discharged from the nozzle even when the nozzle is not covered by one's lips so that one can blow easily and does not have to worry that the air inside the inflatable object would leak out to the atmosphere.

A further object of the present invention is to provide a nozzle which can be hidden beneath the surface of the inflatable object when the main body of the nozzle is pressed such that the nozzle is not subject to dislocation or the plug is not subject to loosening during vigorous use of the inflatable object.

Still another object of the present invention is to provide a nozzle which further comprises a band or a tie at a side of the air inlet so that the plug can be securely fastened. These and other features and objects of the present invention will become apparent to those skilled in the art after reading the detailed description provided hereinbelow, with appropriate reference to the accompanying drawings.

DETAILED DESCRIPTION OF THE PREFERRED EMBODIMENT

Figure 1:
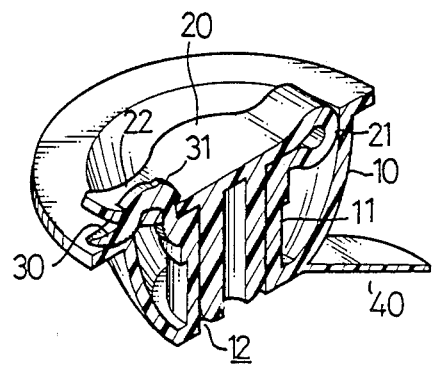
FIG. 1 is a cutaway perspective view of a nozzle in accordance with the present invention.
Figure 2:
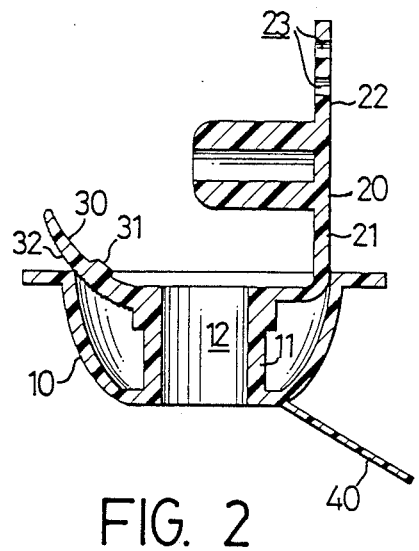
FIG. 2 is an elevational sectional view of the nozzle shown in FIG. 1 with the plug thereof opened.

Referring to FIGS. 1 and 2, it can be seen that a nozzle in accordance with the present invention comprises a substantially conical nozzle seat 10 which is subject to engagable with an inflatable object such as a toy balloon, a beach ball or a beach mattress, an annular wall 11 extending from the nozzle seat 10 which in turn defines an air inlet 12, a plug 20 for blocking the air inlet 12, a plug arm 21 extending from the annular wall 11 and connecting the plug 20 with the nozzle seat 10, a plug extension 22 extended from the plug 20 at a position remote from the plug arm 21, two holes 23 formed on the plug extension 22, a band or a tie 30 formed at a side of the air inlet 12 opposite the plug arm 21 for optional engagement with the plug extension 22, and a piece of one-way membrane 40 extending from a lower portion of the nozzle seat 10.

As with conventional nozzles, the nozzle in accordance with the present invention is made of plastic material, such as polyvinyl chloride or the like.

The nozzle seat 10 is normally retracted into the inflatable object by pressure thereupon. Due to the conical shape of the nozzle seat 10 (as shown in the drawings), drawing out (extended) and pushing in (retracting) the nozzle seat 10 from the surface of the inflatable object is easy and fast. In other words, the nozzle seat 10 is protrudable from a surface of said inflatable object only when it is extended from the surface of the inflatable object for inflation of the inflatable object.

It is appreciated that the plug 20 is securely fastenable on the nozzle seat 10 with the main body thereof insertable into the air inlet 12 and with the tie 30 passable through the two holes 23. The main body of the plug 20 is substantially the same size as that of the air inlet 12. The main body of the plug 20 can be constructed in any suitable configuration, such as a hollow cylindrical form as shown in the drawings or a solid cylindrical form or the like.

Although not limited thereto, it is preferable that the tie 30 has a knob 31 at one side thereof. The tie 30 is positionable between the holes 23 after the insertion of the tie 30 therethrough so as to prevent the tie 30 from slipping back after passing through the holes 23 of the plug extension 22. It is also preferable that the tie 30 be provided with a serrated surface 32 at the side opposite to the knob 31 such that the engagement between the tie 30 and the plug extension 22 is even more firm.

It is appreciated that the one-way membrane 40 is secured at one end to a lower inner face of said nozzle seat 10. The one-way membrane allows air to flow in through the air inlet 12 during inflation but blocks air from flowing out the air inlet 12 when the nozzle seat 10 is protruded (extended) from the surface of the inflatable object.

It can be seen in FIG. 2 that when the plug 20 has been inserted into the air inlet 12 and the tie 30 has been fastened on the plug extension 22, the nozzle seat 10 together with the whole structure of the nozzle is retracted into the inflatable object or is positioned beneath the surface of the inflatable object upon a simple pressing for the previously mentioned reasons such that the nozzle is not subject to dislocation and the plug 20 is not subject to loosening when the inflatable object is being utilized in a vigorous manner.

Figure 3:
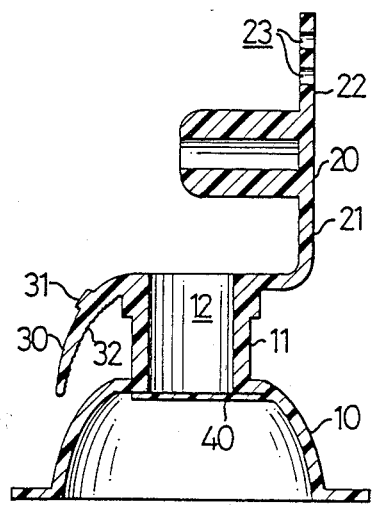
FIG. 3 is a sectional view similar to FIG. 2, illustrating the nozzle when the nozzle is ready for inflation.

With particular reference to FIGS. 3, 4, 5 and 6, the way the nozzle is used is clearly depicted. Firstly, the plug 20 together with the plug extension 22 are pulled from the nozzle such that the whole nozzle protrudes (extends) from the surface of the inflatable object and the air inlet 12 is opened or exposed for inflation, as shown in FIG. 3, so that the nozzle is ready for inflation.

Figure 4:
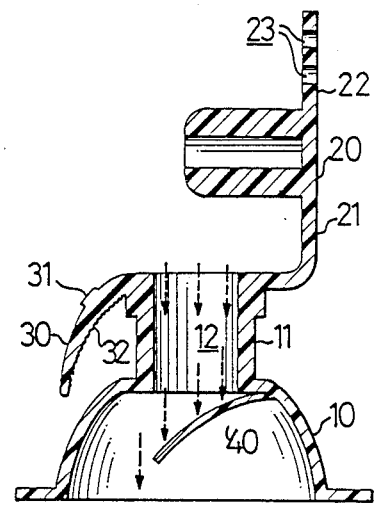
FIG. 4 is a sectional view illustrating the orientation of the nozzle and the direction of air flow during inflation (inflation condition)

In FIG. 4, it is shown that air is input into the interior of the inflatable object (inflation condition) through the air inlet 12 in the direction indicated by the arrows. It can also be seen that the air flowing downwards urges the one-way membrane 40 downwards while entering the interior of the inflatable object.

Figure 5:
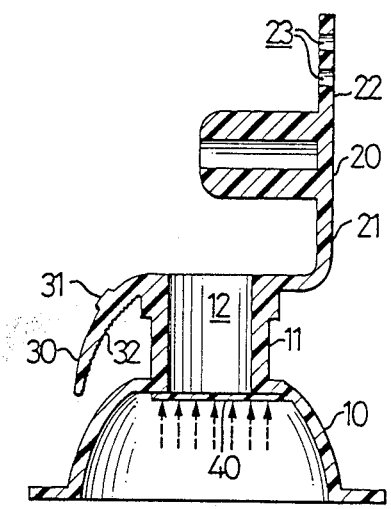
FIG. 5 is a sectional view similar to FIG. 4, illustrating the orientation of the nozzle in non-inflation condition.
Figure 6:
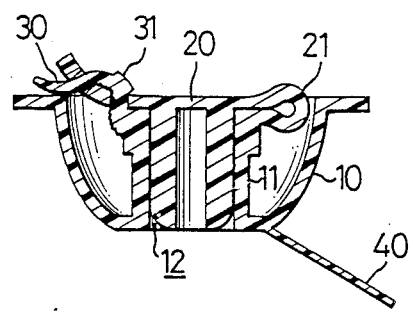
FIG. 6 is a sectional view showing the structure of the nozzle after the inflatable object is filled with air and the plug of the nozzle is engaged.

In FIG. 5, it is shown that when not inflating the inflatable object (non-inflation condition), the one-way membrane 40 will be urged upwards by the air pressure inside the inflatable object, thereby blocking the air inlet 12. Thus, the air inside the inflatable object will not be discharged from or exit the nozzle.

After the inflatable object is filled with air, the air inlet 12 is plugged by the plug 20. Further referring to FIG. 6, the main body of the plug 20 is inserted into the air inlet 12 and the tie 30 is fastened to the plug extension 22 by passing through the two holes 23.

Figure 7:
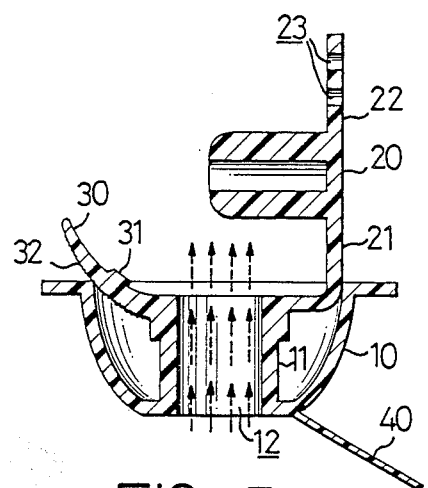
FIG. 7 is a schematic sectional view illustrating the orientation of the nozzle when releasing air.
Figure 8:
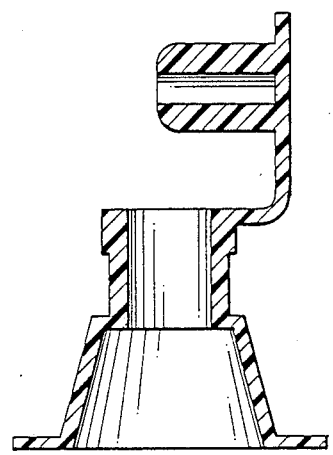
FIG. 8 is a sectional view of a conventional nozzle in open position.

When it is desired to discharge the air inside the inflatable object, one may loose the tie 30 and pull out the plug 20 from the air inlet 12 while leaving the nozzle in retracted state such that the nozzle seat 10 is in the configuration shown in FIG. 7 and that the one-way membrane 40 is not in a position to block the air inlet 12. The air inside the inflatable object thus can be discharged to the atmosphere.

While the present invention has been explained in relation to its preferred embodiment, it is to be understood that various modifications thereof will be apparent to those skilled in the art upon reading this specification. The invention disclosed herein is therefore intended to cover all such modifications as fall within the scope of the appended claims.

I claim:

1. A nozzle for an inflatable object being made of a plastic material, comprising:
    a nozzle seat which is retractable into said inflatable object upon pressing and extendable from a surface of said inflatable object only when being pulled out for inflation of said inflatable object;
    an annular wall extended from said nozzle seat which defines an air inlet for air;
    a plug which is insertable into said air inlet;
    a plug arm extending from said annular wall and connecting said plug with said nozzle seat; and
    a piece of one-way membrane extending from a lower inner face of said nozzle seat and allowing air to flow in through said air inlet during inflation but blocking air from flowing out from said air inlet when said nozzle seat is extended from a surface of said inflatable object.

2. A nozzle as set forth in claim 1, wherein said plastic material is polyvinyl chloride.

3. A nozzle as set forth in claim 1 further comprising a plug extension extended from said plug at a position remote from said plug arm, said plug extension having two holes thereon, and a tie at a side of the air inlet opposite said plug arm being passable through said two holes for engagement with said plug extension.

4. A nozzle as set forth in claim 3, wherein said tie has a knob at one side thereof which will be positioned between said two holes after the insertion of said tie through said two holes.

5. A nozzle as set forth in claim 4, wherein said tie has a serrated surface at a side opposite to said knob.

* * * * *